W. COOPER.
SYSTEM OF OPERATION FOR ALTERNATING CURRENT MOTORS AND GENERATORS.
APPLICATION FILED SEPT. 3, 1907.
977,597.
Patented Dec. 6, 1910.
Fig. 1.
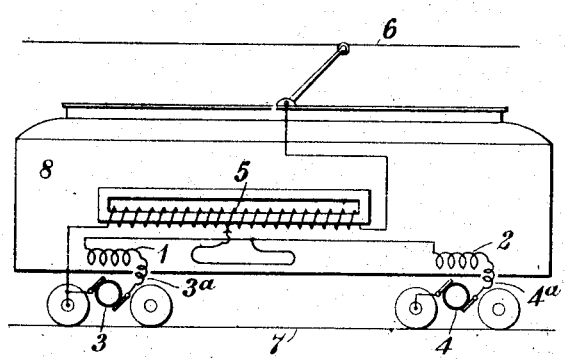
Fig. 2.
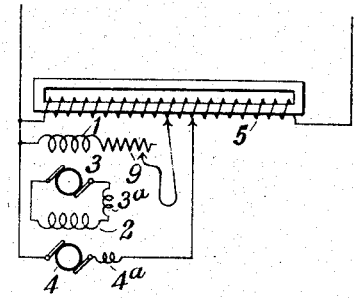
Fig. 5.
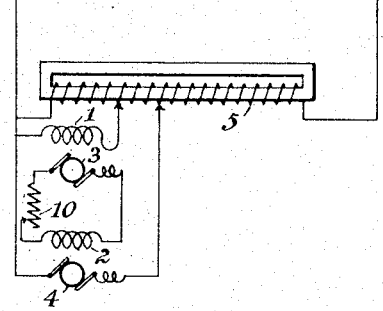
Fig. 3.
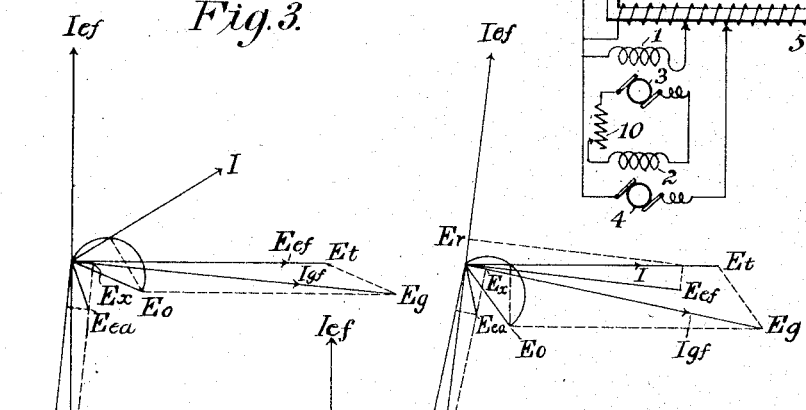
Fig. 4.
Fig. 6.
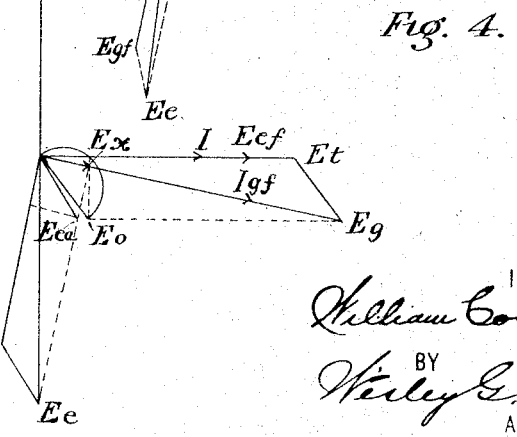
WITNESSES:
C. L. Belcher
Otto J. Schairer
INVENTOR
William Cooper
BY
Wesley G. Carr
ATTORNEY

UNITED STATES PATENT OFFICE.

WILLIAM COOPER, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF OPERATION FOR ALTERNATING-CURRENT MOTORS AND GENERATORS.

977,597.   Specification of Letters Patent.   Patented Dec. 6, 1910.

Application filed September 3, 1907. Serial No. 391,225.

*To all whom it may concern:*

Be it known that I, WILLIAM COOPER, a citizen of the United States, and a resident of Pittsburg, in the county of Allegheny and State of Pennsylvania, have invented a new and useful Improvement in Systems of Operation for Alternating-Current Motors and Generators, of which the following is a specification.

My invention relates to dynamo-electric machines of the commutator type, and to systems of operation therefor.

The object of my invention is to provide means whereby alternating current motors may be converted into generators and may be caused to supply current to the circuit in connection with which they are employed that shall be substantially in phase with the electromotive force of the circuit.

It is usually very desirable that motors employed to propel railway and similar vehicles may be converted into braking generators, in order that the potential energy possessed by the vehicle, when coasting or stopping, may be transformed into electrical energy and supplied to the distributing circuit.

If two or more alternating current motors of the commutator type are employed upon a vehicle, the above mentioned result may be effected by utilizing one of the motors as an exciter for the field magnet windings of the remaining motors the armatures of which are connected to the distributing circuit or line, the field magnet winding of the exciter being supplied from the line.

As motors are usually constructed, the ohmic resistances of the field magnet windings are very low and, therefore, the currents in the said windings and, consequently, also the generated electromotive forces are approximately 90° out of phase with the electromotive forces applied to the field magnet windings. Since the machines in the system are connected in tandem, the electromotive forces of the armatures that are connected to the line are substantially in phase with the electromotive force of the line. However, by reason of the inductance unavoidably present in the armature circuit, the current supplied to the line may be considerably out of phase with the line electromotive force, while, in order to return the maximum amount of power to the line, the said current and electromotive force should be in phase with each other.

According to the present invention, the current supplied to the line may be caused to agree in phase with the line electromotive force, or to lead or lag behind the same, as desired, by adjusting the phase of the electromotive force applied to the field magnet windings of the generators with respect to the line electromotive force, the adjustment being effected by inserting an ohmic resistance, either in circuit with the field magnet winding of the exciter, or in the armature circuit of the exciter.

My invention is illustrated in the accompanying drawings, Figure 1 of which is a diagrammatic view of the arrangement of the circuits when operating the machines as motors. Fig. 2 is a diagrammatic view of one arrangement of the circuits when operating the machines as generators. Figs. 3 and 4 are vector diagrams illustrating phase relations of the currents and electromotive forces when operating the machines as generators. Fig. 5 is a diagrammatic view of another arrangement of the circuits for operating the machines as generators. Fig. 6 is a vector diagram illustrating the phase relations of the currents and electromotive forces in the system shown in Fig. 5.

In the system shown in Fig. 1, two dynamo-electric machines of the commutator type of construction having field magnet windings 1 and 2, armatures 3 and 4 and compensating windings $3^a$ and $4^a$ adjacent to and in series with the armatures, are connected in parallel relation between suitable points in a transformer winding 5, that is connected between conductors 6 and 7 of a suitable distributing circuit or line. The field magnet and armature windings of each machine are connected in series relation for operating the machines as motors, and the speed of operation may be varied by adjusting the active length of the portion of the transformer winding 5 that is included in circuit with the motors, a suitable means for effecting this result, without causing injury to the controlling devices, being set forth in Patent No. 797,060, granted August 15, 1905, to the Westinghouse Electric & Manufacturing Company as assignee of Ray P. Jackson, and in Patent No. 834,525, granted October 30, 1906 to the Westinghouse Electric & Manufacturing Company as assignee of Ray P. Jackson. The motors are here shown as employed for propelling a railway vehicle 8, the transformer 5 being carried by the vehicle and the line conductors 6 and 7 being the trolley conductor and track rail, respectively, of the railway system. It will be understood, however, that the invention may be embodied in other than railway systems whenever it is found desirable to do so.

In order that the machines may be operated as generators when stopping the vehicle, or when it is coasting, or when descending a grade, for the purpose of assisting in braking and for converting the potential energy of the vehicle into electrical energy to be returned to the distributing circuit or line, field magnet winding 1 is connected to, and is supplied with exciting current from, the transformer winding 5, while armature 3 of the same machine supplies exciting current to field magnet winding 2 of the other machine, the armature 4 of which is connected between suitable points of, and supplies current to, the transformer winding 5. While, with such an arrangement of circuits, the electromotive force generated in the armature 4 will be substantially in phase with the electromotive force of the transformer winding 5, since the electromotive force applied to each field magnet winding of the tandem-connected machines will be substantially 90° out of phase with electromotive forces generated in the corresponding armatures, the current in the circuit of the armature 4, i. e., the current returned to the line through the transformer winding 5, will be considerably out of phase with the electromotive force of the transformer on account of the inductance of the armature. This will be readily understood from a consideration of the vector diagram of Fig. 3. In Fig. 3, and in the succeeding vector diagram, $E_t$ represents, in phase and value, the electromotive force of the transformer winding 5 between the terminals of the armature 4 when the circuits are arranged as in Fig. 2, for operation of the machines as generators. $E_{et}$ represents the electromotive force applied to the field magnet winding 1, which is in phase with the transformer electromotive force $E_t$, if no external devices are included in the circuit with the field magnet winding. $I_{et}$ represents the current in the field magnet winding 1 of the exciter generator. This current lags approximately 90° behind the applied electromotive force $E_{et}$ because, as such machines are usually constructed, the ohmic resistance of the field magnet winding is substantially negligible in comparison with the inductive resistance. It also represents the exciter field flux. $E_e$ represents the electromotive force generated by the exciter armature 3 which is in phase with the field flux. As here represented, however, it is 180° out of phase with the field current $I_{et}$, the armature connections being considered as reversed. $E_{ea}$ represents the component of the generated electromotive force $E_e$ required to overcome the impedance of the exciter armature 3. $E_{gf}$ represents the component of the generated electromotive force $E_e$ applied to the field magnet winding 2 of the generator that supplies current to the line. $I_{gf}$ represents the current in the field magnet winding 2 and also the flux produced thereby. It lags approximately 90° behind the electromotive force $E_{gf}$ because of the low ohmic and high inductive resistance of the field winding. $E_g$ represents the electromotive force generated in the armature 4, it being in phase with the field current $I_{gf}$. $E_a$ represents the impedance drop in the circuit of the armature 4. I represents the current in the circuit of the armature 4 or that supplied to the line. Its phase is determined, with reference to the electromotive force $E_g$, by the relation of the ohmic to the inductive resistances in the armature circuit, and because of the inductive resistance, it lags behind the said electromotive force, and is also very much out of phase with the transformer electromotive force $E_t$. Since the amount of power returned to the line is equal to the component of the current that is in phase with the transformer electromotive force, and the said electromotive force, it is evident that the maximum amount of power for a given current will be returned to the line when the current I and the transformer electromotive force $E_t$ agree in phase.

In order to cause the current I to agree in phase with the transformer electromotive force $E_t$, I propose to insert a resistance 9 in series with the field magnet winding 1 of the exciter generator in order to shift the phase of the electromotive force applied to the field magnet winding 2 with respect to the transformer electromotive force $E_t$. The effect of placing the resistance 9 in series with the field winding 1 may be understood from a consideration of the vector diagram of Fig. 4. $E_r$ represents the electromotive force applied to the resistance 9, and it is in phase with the current $I_{et}$ in the circuit. The electromotive force $E_{et}$ applied to the field winding 1 is, therefore, no longer in phase with the transformer electromotive force $E_t$, as represented in Fig. 3, but the transformer electromotive force $E_t$ is the resultant of the electromotive forces $E_{et}$ and $E_r$. The remainder of the diagram of Fig. 4 is constructed in the same manner as the diagram of Fig. 3, and the same reference characters are employed. It will be observed that the electromotive force $E_{gf}$, applied to the field magnet winding 2 and, consequently, also the current $I_{gf}$ in the said winding and the electromotive force $E_g$ generated in the armature core are so shifted in phase with respect to the transformer electromotive force $E_t$ that the current $I$ in the circuit of the armature 4 is brought into phase with the transformer electromotive force $E_t$. While this is usually the most desirable condition under which to return power to the line, it may become desirable, in certain instances, to cause the current $I$ to lead or even lag behind the transformer electromotive force $E_t$, and this result may be readily effected, as will be at once understood from a consideration of the diagrams of Figs. 3 and 4, by adjusting the value of the resistance 9.

The desired phase relations may also be secured by inserting a resistance 10 in the circuit including the exciter armature 3 and the generator field winding 2, as will be understood from a consideration of the vector diagram of Fig. 6. In this diagram, as well as in the other vector diagrams, $E_x$ represents the resistance component of the electromotive force $E_{ea}$ required to overcome the impedance other than that of the field magnet winding 2 in circuit with the exciter armature 3. By increasing the value of the resistance component $E_x$, as is done in Fig. 5, and as represented in Fig. 6, the phase of the electromotive force $E_{gf}$ applied to the generator field winding 2 may be shifted with respect to the electromotive force $E_e$ generated by the exciter armature 3. This, in turn, serves to shift the phase of the electromotive force $E_g$ generated by the armature 4, and the current $I$ is thereby brought into phase with the transformer electromotive force $E_t$, or it may be caused to bear other desired phase relations with respect thereto by properly adjusting the value of the resistance 10.

I claim as my invention:

1. The combination with an alternating current distributing circuit, and a generator connected thereto, of an exciter that supplies the field magnet winding of the generator having its field magnet winding connected to the distributing circuit, and means interposed between the connections to the distributing circuit for adjusting the phase of the current supplied to the circuit with respect to the electromotive force of the circuit.

2. The combination with an alternating current distributing circuit, and a generator connected thereto, of an exciter that supplies the field magnet winding of the generator having its field magnet winding connected to the distributing circuit, and means interposed between the connections to the distributing circuit for causing the current supplied to the circuit to agree approximately in phase with the electromotive force of the circuit.

3. The combination with an alternating current distributing circuit, and a generator connected thereto, of an exciter that supplies the field magnet winding of the generator having its field magnet winding connected to the distributing circuit, and a variable resistance interposed in circuit with one of said field magnet windings for adjusting the phase of the current supplied to the distributing circuit with respect to the electromotive force of the circuit.

4. The combination with an alternating current distributing circuit, and a generator connected thereto, of an exciter that supplies the field magnet winding of the generator having its field magnet winding connected to the distributing circuit, and a resistance interposed in circuit with one of said field magnet windings for causing the current supplied to the distributing circuit to agree approximately in phase with the electromotive force of the circuit.

5. The combination with an alternating current distributing circuit, and a generator that supplies current thereto, an exciter that supplies the field magnet winding of the generator having its field magnet winding connected to the distributing circuit, and means disposed in the circuit of the field magnet winding of the exciter for adjusting the phase of the current supplied to the circuit with respect to the electromotive force of the circuit.

6. The combination with an alternating current distributing circuit, and a generator that supplies current thereto, an exciter that supplies the field magnet winding of the generator having its field magnet winding connected to the distributing circuit, and a resistance disposed in the circuit of the field magnet winding of the exciter for adjusting the phase of the current supplied to the circuit with respect to the electromotive force of the circuit.

7. The combination with an alternating current distributing circuit, and a dynamo-electric machine connected thereto, of an exciter that supplies the field magnet winding of the dynamo-electric machine having its field magnet winding connected to the distributing circuit, and means interposed between the said connections to the distributing circuit for adjusting the phase of the current in the armature circuit of the dynamo-electric machine with respect to the electromotive force of the distributing circuit.

In testimony whereof, I have hereunto subscribed my name this 24th day of August, 1907.

WILLIAM COOPER.

Witnesses:
HOWARD L. BEACH,
BIRNEY HINES.